United States Patent
Umemura et al.

(10) Patent No.: US 12,539,859 B2
(45) Date of Patent: Feb. 3, 2026

(54) CONTROL DEVICE FOR HYBRID VEHICLE

(71) Applicant: TOYOTA JIDOSHA KABUSHIKI KAISHA, Toyota (JP)

(72) Inventors: Yoshihisa Umemura, Nagoya (JP); Suguru Kumazawa, Nisshin (JP); Yasutaka Tsuchida, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 268 days.

(21) Appl. No.: 18/341,592

(22) Filed: Jun. 26, 2023

(65) Prior Publication Data

US 2024/0001923 A1    Jan. 4, 2024

(30) Foreign Application Priority Data

Jun. 29, 2022    (JP) .................. 2022-104751

(51) Int. Cl.
*B60W 30/18*    (2012.01)
*B60W 10/06*    (2006.01)
(Continued)

(52) U.S. Cl.
CPC ...... *B60W 30/18009* (2013.01); *B60W 10/06* (2013.01); *B60W 10/08* (2013.01); *B60W 20/10* (2013.01); *F02D 41/0235* (2013.01); *F02D 41/123* (2013.01); *B60W 2510/068* (2013.01); *B60W 2552/15* (2020.02);
(Continued)

(58) Field of Classification Search
CPC ........... B60W 30/18009; B60W 10/06; B60W 10/08; B60W 20/10; B60W 2510/068; B60W 2552/15; B60W 2710/0627; B60W 2720/106; F02D 41/0235; F02D 41/123; F02D 2200/0802
See application file for complete search history.

(56) References Cited

U.S. PATENT DOCUMENTS 11,608,793 B2    3/2023    Kumazawa et al.
2006/0064225 A1 *  3/2006   Tabata .............. B60W 10/115
                                                701/55
(Continued)

FOREIGN PATENT DOCUMENTS

CN    109252919 B  *  3/2025    ............. F01N 9/002
JP    5696790 B2    4/2015
(Continued)

*Primary Examiner* — Aniss Chad
*Assistant Examiner* — Stephanie T Su
(74) *Attorney, Agent, or Firm* — Finnegan, Henderson, Farabow, Garrett and Dunner, LLP

(57) ABSTRACT

A control device for a hybrid vehicle, includes a deceleration control unit configured to control an engine and a motor as traveling power sources to control deceleration of the hybrid vehicle, a fuel cut control unit configured to restrict or permit fuel cut in the engine based on establishment or non-establishment of a predetermined condition, a downhill control unit configured to execute downhill control for increasing deceleration during downhill traveling higher than deceleration during flat traveling, and a deceleration limit unit configured to limit deceleration in restricting the fuel cut and in executing the downhill control lower than deceleration in permitting the fuel cut and in executing the downhill control.

4 Claims, 4 Drawing Sheets

(51) Int. Cl.
  *B60W 10/08* (2006.01)
  *B60W 20/10* (2016.01)
  *F02D 41/02* (2006.01)
  *F02D 41/12* (2006.01)
(52) U.S. Cl.
  CPC ............... *B60W 2710/0627* (2013.01); *B60W 2720/106* (2013.01); *F02D 2200/0802* (2013.01)

(56) References Cited

U.S. PATENT DOCUMENTS

| | | | |
|---|---|---|---|
| 2012/0109432 A1* | 5/2012 | Pitsch | B60W 30/18136 903/903 |
| 2014/0297087 A1 | 10/2014 | Amano | |
| 2017/0051652 A1* | 2/2017 | De Smet | F01N 3/035 |
| 2018/0156097 A1* | 6/2018 | Suzuki | F01N 3/029 |
| 2020/0216068 A1* | 7/2020 | Tashiro | F02D 29/02 |
| 2022/0333542 A1 | 10/2022 | Kumazawa et al. | |

FOREIGN PATENT DOCUMENTS

| | | |
|---|---|---|
| JP | 2017-177823 A | 10/2017 |
| WO | WO 2013/065166 A1 | 5/2013 |

\* cited by examiner

CONTROL DEVICE FOR HYBRID VEHICLE

CROSS-REFERENCE TO RELATED APPLICATION

This application is based upon and claims the benefit of priority of the prior Japanese Patent Application No. 2022-104751, filed on Jun. 29, 2022, the entire contents of which are incorporated herein by reference.

FIELD OF THE INVENTION

The present disclosure relates to a control device for a hybrid vehicle.

BACKGROUND

In a hybrid vehicle, deceleration of the vehicle is ensured by executing fuel cut (see, for example, Japanese Unexamined Patent Application Publication No. 2017-177823).

The fuel cut may be restricted based on establishment of a predetermined condition. When the fuel cut is restricted, deceleration is reduced. In such cases, downhill control that requires high deceleration may be executed. When the fuel cut is restricted and the downhill control requiring high deceleration is executed, it is conceivable to ensure high deceleration in accordance with an increase in regenerative torque of the motor. However, in this case, a load on the motor might increase.

SUMMARY OF THE INVENTION

It is therefore an object of the present disclosure to provide a control device for a hybrid vehicle that suppresses an increase in a load on a motor.

The above object is achieved by a control device for a hybrid vehicle, the control device including: a deceleration control unit configured to an engine and a motor as traveling power sources so as to control deceleration of the hybrid vehicle; a fuel cut control unit configured to restrict or permit fuel cut in the engine based on establishment or non-establishment of a predetermined condition; a downhill control unit configured to execute downhill control for increasing deceleration during downhill traveling higher than deceleration during flat traveling; and a deceleration limit unit configured to limit deceleration in restricting the fuel cut and in executing the downhill control so as to be lower than deceleration in permitting the fuel cut and in executing the downhill control.

The deceleration limit unit may be configured to limit deceleration in restricting the fuel cut and in executing the downhill control so as to be higher than deceleration in restricting the fuel cut and in stopping the downhill control.

The deceleration limit unit may be configured to limit deceleration in restricting the fuel cut and in executing the downhill control so as to be lower than deceleration in permitting the fuel cut and in stopping the downhill control.

The control device may further include an excessive temperature rise estimation unit configured to estimate whether or not a temperature of a filter collecting particulate matters in exhaust gas of the engine excessively rises due to execution of the fuel cut, wherein the fuel cut control unit may be configured to restrict the fuel cut when the predetermined condition is established on condition that the temperature of the filter is estimated to excessively rise, and is configured to permit the fuel cut when the predetermined condition is not established on condition that the temperature of the filter is estimated not to excessively rise.

The control device may further include a notification control unit configured to notify that deceleration is limited when the fuel cut is restricted.

DETAILED DESCRIPTION

[Schematic Configuration of Hybrid Vehicle]

Figure 1:
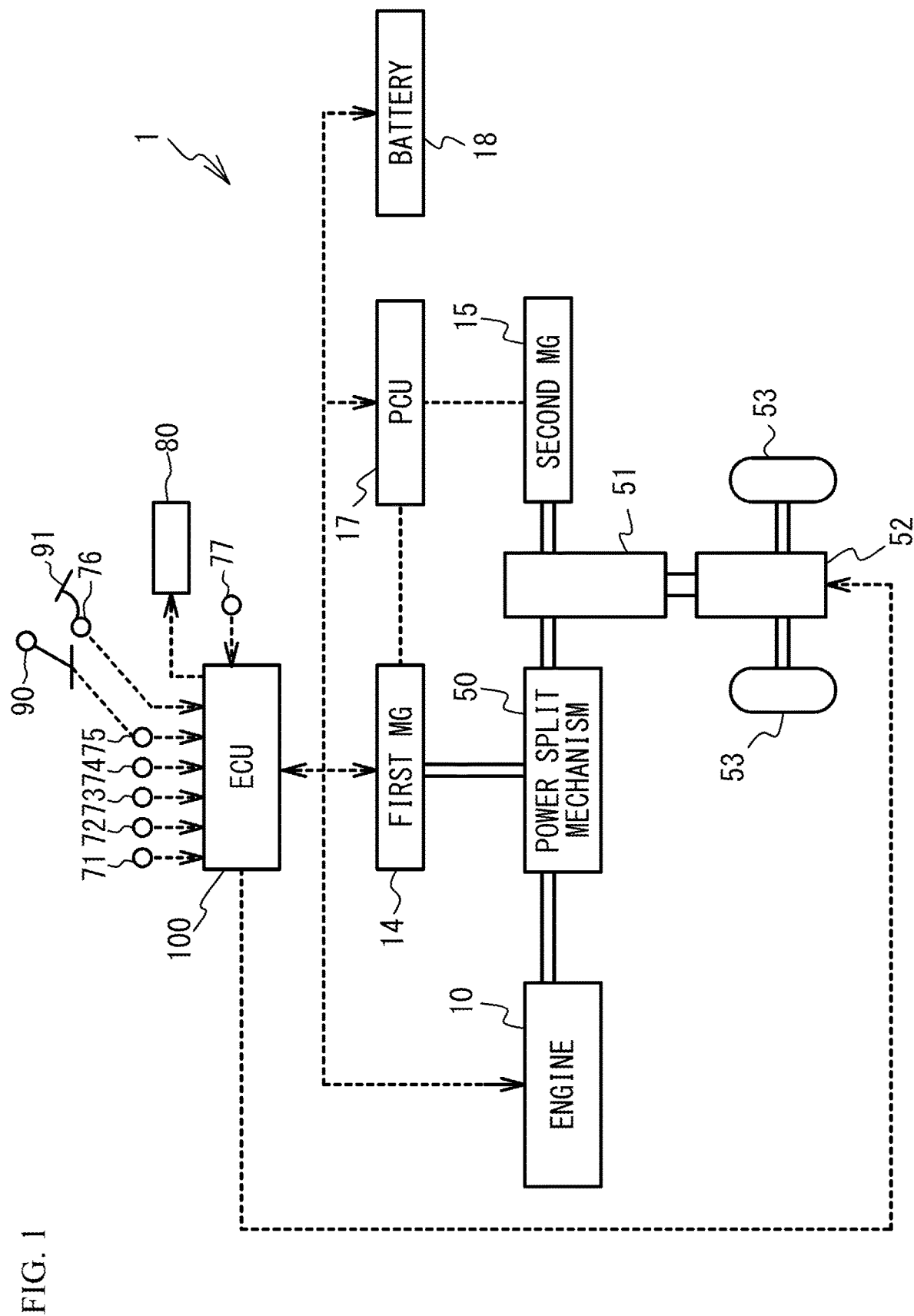
FIG. 1 is a schematic configuration view of a hybrid vehicle of a present embodiment.

FIG. 1 is a schematic configuration view of a hybrid vehicle 1 of the present embodiment. This hybrid vehicle 1 includes an Electronic Control Unit (ECU) 100, an engine 10, a first motor generator (hereinafter referred to as first Motor Generator (MG)) 14, a second motor generator (hereinafter referred to as second MG) 15, a Power Control Unit (PCU) 17, a battery 18, a power split mechanism 50, a transmission mechanism 51, a speed reduction mechanism 52, and drive wheels 53. The engine 10 is, but not limited to, a gasoline engine, and may be a diesel engine. The engine 10, the first MG 14, and the second MG 15 are traveling power sources for the hybrid vehicle 1 to travel.

Each of the first MG 14 and the second MG 15 has a function as a motor that outputs torque when driving electric power is supplied, and a function as a generator that generates regenerative electric power when torque is applied. Specifically, the first MG 14 and the second MG 15 are AC rotary electric machines. An AC rotary electric machine is, for example, a permanent magnet synchronous motor having a rotor in which permanent magnets are embedded.

The first MG 14 and the second MG 15 are electrically connected to the battery 18 via the PCU 17. The PCU 17 includes a first inverter that exchanges electric power with the first MG 14, a second inverter that exchanges electric power with the second MG 15, and a converter. The converter boosts and supplies the electric power of the battery 18 to the first and second inverters, and reduces the electric power supplied from the first and second inverters and supplies the electric power to the battery 18. The first inverter converts DC electric power from converter into AC electric power and supplies the AC electric power to the first MG 14, and converts AC electric power from the first MG 14 into DC electric power and supplies the DC electric power to the converter. The second inverter converts DC electric power from the converter into AC electric power and supplies the AC electric power to the second MG 15, and converts AC electric power from the second MG 15 into DC electric power and supplies the DC electric power to the converter. That is, the PCU 17 charges the battery 18 by use of the regenerated electric power generated by the first MG 14 or the second MG 15 and drives the first MG 14 or the second MG 15 by use of the charged electric power of the battery 18.

The battery 18 includes a plurality of stacked batteries. This battery is, for example, a secondary battery such as a nickel-metal hydride battery or a lithium-ion battery.

The power split mechanism 50 mechanically connects a crankshaft of the engine 10, a rotation shaft of the first MG 14, and an output shaft of the power split mechanism 50. The power split mechanism 50 is, for example, a planetary gear mechanism including a sun gear, a planetary carrier, a pinion gear, and a ring gear. The output shaft of the power split mechanism 50 is connected to the transmission mechanism 51. The rotation shaft of the second MG 15 is also connected to the transmission mechanism 51. The transmission mechanism 51 is connected to the speed reduction mechanism 52, and each driving force of the engine 10, the first MG 14, and the second MG 15 is transmitted to the drive wheels 53 via the transmission mechanism 51 and the speed reduction mechanism 52.

The speed reduction mechanism 52 is a multi-stage automatic transmission that changes a transmission ratio by changing a gear ratio under the control of the ECU 100. As a result, the speed reduction mechanism 52 switches driving force transmission states. The driving force transmission states include neutral (N) range, drive (D) range, reverse (R) range, and parking (P) range. In the N range, driving force transmission to the drive wheels 53 is cut off. In the D range, forward travel is possible. In the R range, reverse travel is possible. In the P range, driving force transmission to the drive wheels 53 is cut off and the rotation of the output shaft of the speed reduction mechanism 52 is mechanically prevented. The range of the speed reduction mechanism 52 is switched by drive's manual operation of a shift lever 90. Instead of the speed reduction mechanism 52, a continuously variable transmission (hereinafter referred to as Continuously Variable Transmission (CVT)) that continuously changes the gear ratio may be employed.

The ECU 100 is an electronic control unit that includes an arithmetic processing circuit that performs various kinds of arithmetic processing related to vehicle travel control, and a memory that stores control programs and data. The ECU 100 is an example of a control device for the hybrid vehicle 1, and functions as a deceleration control unit, a fuel cut control unit, a downhill control unit, a deceleration limit unit, an excessive temperature rise estimation unit, and a notification control unit, which will be described later in detail.

A display unit 80 is provided on an instrument panel of the hybrid vehicle 1. The display unit 80, which will be described later in detail, is an example of a notification unit that notifies that deceleration of the hybrid vehicle 1 is suppressed due to the restriction of the fuel cut. Note that, instead of the display unit 80, for example, a speaker of an audio system, a navigation system, or the like of the hybrid vehicle 1 may be used.

Signals from an ignition switch 71, a water temperature sensor 72, a crank angle sensor 73, an airflow meter 74, a shift position sensor 75, an accelerator opening sensor 76, a road gradient sensor 77 are input to the ECU 100. The water temperature sensor 72 detects the temperature of cooling water for the engine 10. The crank angle sensor 73 detects the engine rotation speed, which is the rotation speed of the crankshaft of the engine 10. The airflow meter 74 detects the amount of intake air introduced into the engine 10. The shift position sensor 75 detects the operating position of the shift lever 90. The accelerator opening sensor 76 detects the operating position of an accelerator pedal 91. The road gradient sensor 77 detects the road gradient when the hybrid vehicle 1 travels.

The ECU 100 controls acceleration and deceleration based on an accelerator operation amount. Specifically, each output of the engine 10, the first MG 14, and the second MG 15 is controlled so as to achieve the target acceleration or deceleration set based on the accelerator operation amount.

The output of the engine 10 is controlled by an amount of intake air and an amount of fuel injection. Each output of the first MG 14 and the second MG 15 is controlled by the PCU 17. The above control is an example of process executed by the deceleration control unit.

The ECU 100 executes downhill control based on the detection result of the road gradient sensor 77. The downhill control increases the deceleration when the hybrid vehicle 1 travels downhill, as compared with the deceleration when the hybrid vehicle 1 travels flat. In the downhill control, the steeper the angle of the descending slope, the greater the deceleration. The downhill control is not executed during flat traveling or uphill traveling. The downhill control is an example of a process executed by the downhill control unit.

[Schematic Configuration of Engine]

Figure 2:
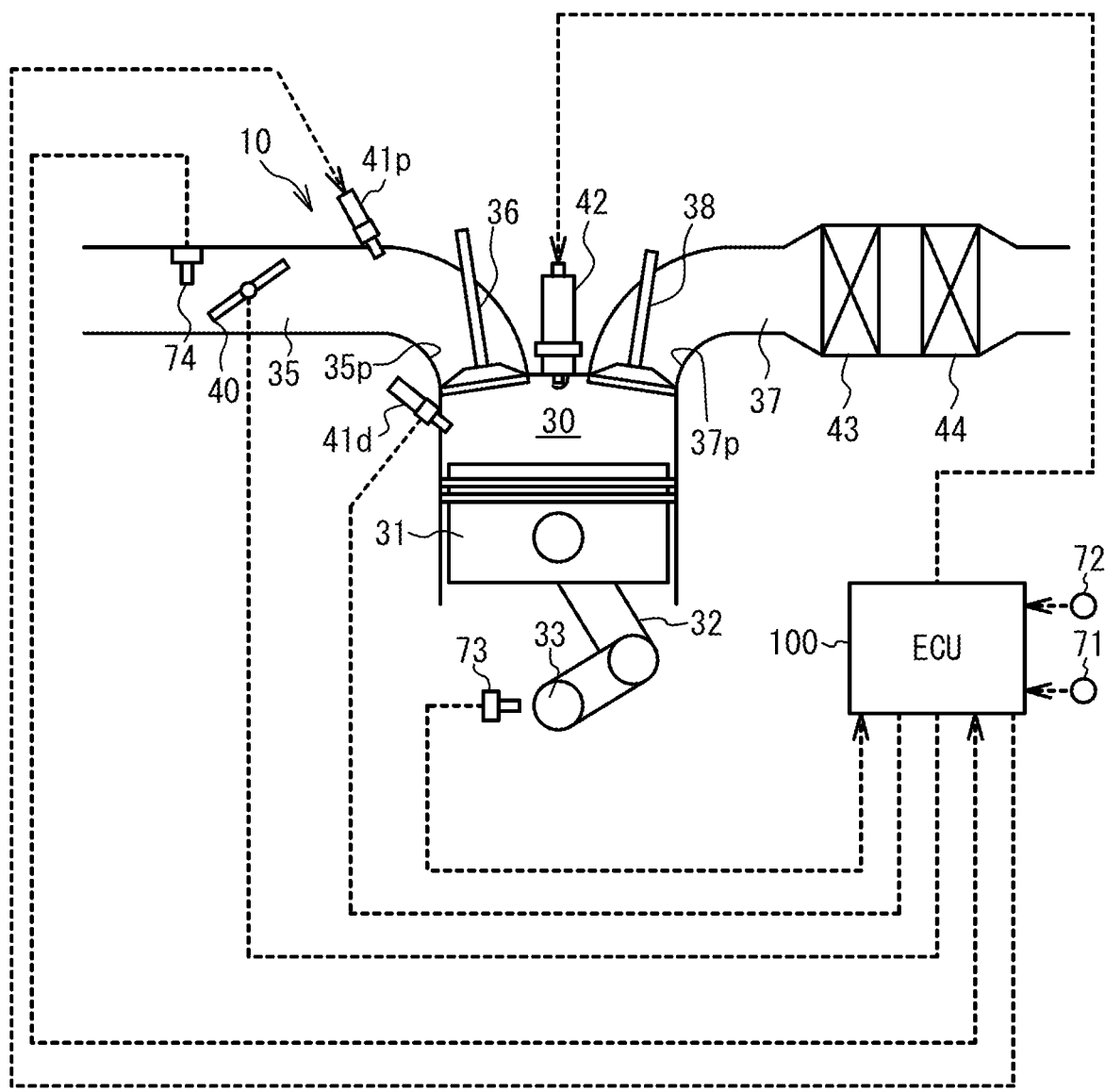
FIG. 2 is a schematic configuration view of an engine.

FIG. 2 is a schematic configuration view of the engine 10. The engine 10 has cylinders 30, pistons 31, connecting rods 32, a crankshaft 33, an intake passage 35, intake valves 36, exhaust passages 37, and exhaust valves 38. Only one of the cylinders 30 of the engine 10 is illustrated in FIG. 2. The air-fuel mixture is combusted in the cylinder 30. The piston 31 is housed in each cylinder 30 for reciprocation, and is connected to the crankshaft 33, serving as output shaft of the engine 10, via the connecting rod 32. The connecting rod 32 and the crankshaft 33 convert reciprocating motion of the piston 31 into rotational motion of the crankshaft 33.

The cylinder 30 is provided with an in-cylinder injection valve 41d. The in-cylinder injection valve 41d directly injects fuel into the cylinder 30. The intake passage 35 is provided with a port injection valve 41p that injects fuel toward an intake port 35p. Each cylinder 30 is provided with an ignition device 42 that discharges spark to ignite a mixture of intake air introduced through the intake passage 35 and fuel injected by the in-cylinder injection valve 41d and the port injection valve 41p. At least one of the in-cylinder injection valve 41d and the port injection valve 41p may be provided.

The intake passage 35 is connected to the intake port 35p of the cylinder 30 via the intake valve 36. The exhaust passage 37 is connected to an exhaust port 37p of the cylinder 30 via the exhaust valve 38. The intake passage 35 is provided with the above-described airflow meter 74 and a throttle valve 40 for controlling the amount of intake air.

A three-way catalyst 43 and a Gasoline Particulate Filter (GPF) 44 are provided in the exhaust passage 37 from the upstream side in this order. The three-way catalyst 43 contains catalytic metals such as platinum (Pt), palladium (Pd) and rhodium (Rh), has oxygen storage capacity, and purifies NOx, HC and CO.

The GPF 44 is a porous ceramic structure, and collects exhaust particulates (hereinafter referred to as Particulate Matter (PM)) in the exhaust gas. Also, the GPF 44 carries a noble metal such as platinum. In regeneration control, this noble metal accelerates the oxidation reaction of deposited PM. The GPF 44 is an example of a filter. In addition, for example, when the engine 10 is a diesel engine, a Diesel Particulate Filter (DPF) is provided instead of the GPF 44.

An increase or a decrease in opening degree of the throttle valve 40 increases or decreases the amount of intake air introduced into the cylinder 30. The opening degree of the throttle valve 40 is controlled according to an opening degree requested by the ECU 100.

The ECU 100 executes fuel cut to stop fuel injection from the in-cylinder injection valve 41d and the port injection valve 41p of the engine 10 when the engine is in operation and the accelerator opening degree is zero, while the hybrid vehicle 1 is traveling. As a result, the output torque of the engine 10 becomes a negative value, and the hybrid vehicle 1 is decelerated. Moreover, during execution of the fuel cut, air (oxygen) is supplied to the GPF 44, so PM deposited in the GPF 44 burns.

Further, the ECU 100 restricts or permits the fuel cut based on establishment or non-establishment of a predetermined condition, which will be described in detail later. When the fuel cut is restricted, the deceleration is not ensured by the engine 10. When the downhill control is executed in such a case, it is needed to increase the regenerative torque of the first MG 14 and the second MG 15, which might increase the load on the first MG 14 and the second MG 15. Therefore, the ECU 100 executes the following deceleration limit control.

[Deceleration Limit Control Executed by ECU]

Figure 3:
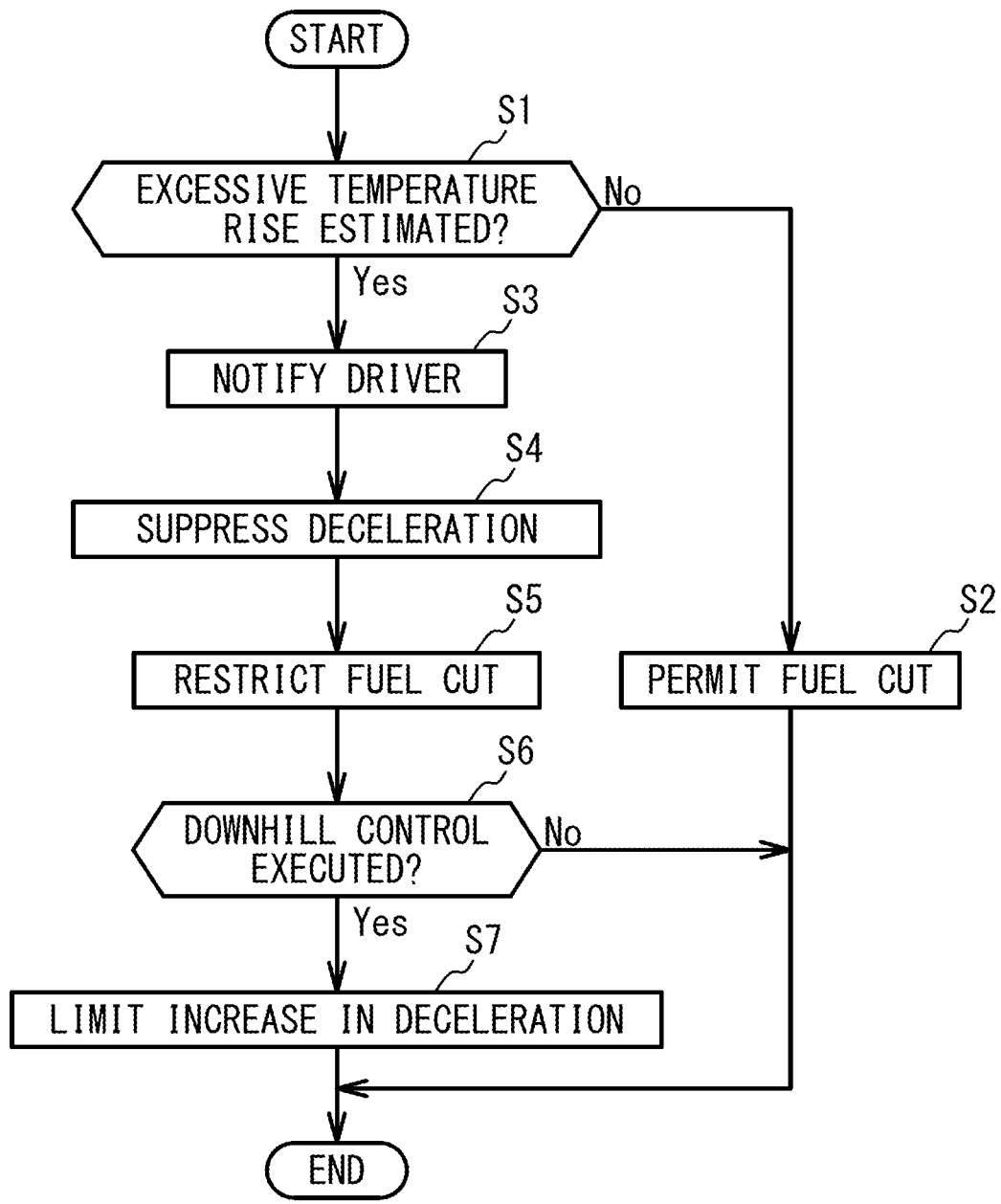
FIG. 3 is a flowchart illustrating an example of deceleration limit control executed by an ECU.

FIG. 3 is a flowchart illustrating an example of deceleration limit control executed by the ECU 100. This control is repeatedly executed at predetermined intervals while the ignition is on. First, the ECU 100 estimates whether or not the temperature of the GPF 44 will rise excessively due to execution of the fuel cut while the engine 10 drives (step S1). Specifically, it is estimated whether or not the temperature of the GPF 44 will rise excessively as follows. The ECU 100 calculates a fuel cut continuable time during which the GPF44 endures the fuel cut. The ECU 100 estimates that the temperature of the GPF 44 will not rise excessively, when the fuel cut continuable time is equal to or longer than a threshold. The ECU 100 estimates that the temperature of the GPF 44 will rise excessively, when the fuel cut continuable time is smaller than the threshold. Step S1 is an example of a process executed by the excessive temperature rise estimation unit.

Figure 4:
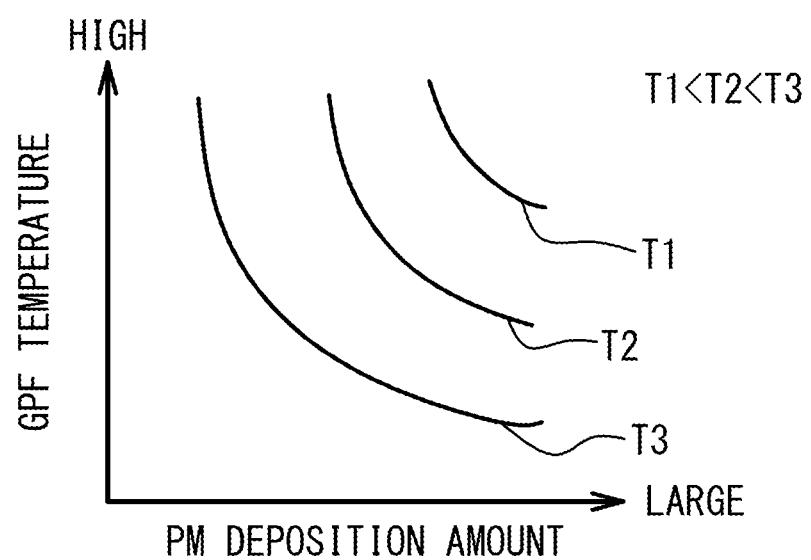
FIG. 4 is an example of a map that defines fuel cut continuable time.

The ECU 100 calculates the fuel cut continuable time with reference to a map of FIG. 4 on the basis of a PM deposition amount in the GPF 44 and the temperature of the GPF 44. FIG. 4 is an example of a map that defines the fuel cut continuable time. This map, calculated beforehand based on experimental results and simulation results, is stored in the ROM of the ECU 100 beforehand. The horizontal axis indicates the PM deposition amount. The vertical axis indicates the temperature of the GPF 44. FIG. 4 illustrates the fuel cut continuable times T1, T2, and T3. The fuel cut continuable time T1 is shorter than each of the fuel cut continuable times T2 and T3. The fuel cut continuable time T3 is longer than each of the fuel cut continuable times T1 and T2. As illustrated in FIG. 4, when the PM deposition amount is large, the fuel cut continuable time is calculated to be a small value, as compared to when the PM deposition amount is small. This is because an increase in the PM deposition amount increases the amount of PM oxidized per unit time when oxygen flows into the GPF 44, so the time required for the temperature of the GPF 44 to reach an upper limit becomes short. Further, when the temperature of the GPF 44 is high, the fuel cut continuable time is calculated to be short, as compared to when the temperature is low. This is because the higher the temperature of the GPF 44, the shorter the time until the temperature of the GPF 44 reaches the upper limit.

The PM deposition amount in the GPF 44 is calculated based on, for example, the engine speed, charging efficiency, and cooling water temperature. The charging efficiency is calculated based on the engine rotation speed and the amount of intake air. The engine speed is calculated based on the detected value of the crank angle sensor 73. The amount of intake air is calculated based on the value detected by the airflow meter 74. The cooling water temperature is calculated based on the detected value of the water temperature sensor 72.

The temperature of the GPF 44 is calculated, for example, based on the engine speed and the charging efficiency. However, the calculation method of the PM deposition amount in the GPF 44 and the temperature of the GPF 44 is not limited thereto. For example, the PM deposition amount may be calculated based on a difference between front pressure of the GPF 44 and back pressure thereof. Also, the temperature of the GPF 44 may be calculated based on the detected value of a temperature sensor. Also, these may be calculated by a well-known method.

In the case of No in step S1, the ECU 100 permits the fuel cut (step S2). Specifically, the ECU 100 turns off a fuel cut restriction flag. In the present embodiment, when the fuel cut restriction flag is off, the fuel cut is executed for all cylinders 30 in accordance with the fuel cut request.

In the case of Yes in step S1, the ECU 100 displays the notification that the deceleration is suppressed on the display unit 80 to notify the driver (step S3). It is possible to notify the driver before the deceleration will be suppressed due to the restriction of the fuel cut, so it is possible to avoid giving the driver a feeling of wrongness caused by the fuel cut not being executed. Step S3 is an example of a process executed by the notification control unit.

Next, the ECU 100 suppresses the deceleration (step S4). The suppression of the deceleration may be achieved by, for example, changing an upper limit of the deceleration to a smaller value, or may be achieved by correcting the deceleration to a smaller value by multiplying the deceleration by a coefficient less than one.

Next, the ECU 100 restricts the fuel cut (step S5). That is, the ECU 100 turns on the fuel cut restriction flag. In the present embodiment, when the fuel cut restriction flag is on, the fuel cut is not executed for any of the cylinders 30 even when the fuel cut is requested. That is, fuel injection is continued in all cylinders 30.

Next, the ECU 100 determines whether or not the downhill control is executed (step S6). In the case of No in step S6, this control is ended.

In the case of Yes in step S6, the ECU 100 limits the deceleration that is required in executing the downhill control (step S7). That is, the deceleration in restricting the fuel cut and in executing the downhill control is limited to be lower than the deceleration in permitting the fuel cut and in executing the downhill control.

The limitation of the deceleration may be changed, for example, by changing the upper limit of the deceleration to a smaller value in permitting the fuel cut and in executing the downhill control. Further, the limitation of the deceleration may be achieved by multiplying the deceleration in permitting the fuel cut and in executing the downhill control by a coefficient less than one to correct the deceleration to a smaller value. Step S7 is an example of a process executed by the deceleration limit unit.

With such limitation of the deceleration, an increase in the regenerative torques in the first MG 14 and the second MG 15 and an increase in the load thereon for ensuring high deceleration in restricting the fuel cut are suppressed. Further, it is possible to prevent the battery 18 from being overcharged by the regenerative electric power of the first MG 14 and the second MG 15. Furthermore, although it is needed to rotate the first MG 14 at a high speed in order to ensure high deceleration due to the mechanism of the speed reduction mechanism 52, such excessive rotation of the first MG 14 is avoided.

The deceleration in restricting the fuel cut and in executing the downhill control is set to be higher than the deceleration in restricting the fuel cut and in stopping the downhill control. The limitation of the deceleration in restricting the fuel cut and in executing the downhill control is achieved by decreasing the charging efficiency and increasing the engine rotation speed as compared to the case where the fuel cut is restricted and the downhill control is stopped. Since at least the downhill control is executed even in restricting the fuel cut, it is possible to avoid giving the driver a feeling of wrongness due to the deceleration being higher than the deceleration in stopping the downhill control.

Further, the deceleration in restricting the fuel cut and in executing the downhill control is limited to be lower than the deceleration in permitting the fuel cut and in stopping the downhill control. This is because, if the deceleration in restricting the fuel cut and in executing the downhill control is equal to the deceleration in permitting the fuel cut and in stopping the downhill control, the load on the first MG 14 and the second MG 15 might increase as described above. The deceleration in executing and stopping the downhill control mentioned above indicates the deceleration when the shift range is in the D range.

The deceleration in restricting the fuel cut and in executing the downhill control is limited to, but not limited, be lower than the deceleration in permitting the fuel cut and in stopping the downhill control. The deceleration in restricting the fuel cut and in executing the downhill control may be equal to or higher than the deceleration in permitting the fuel cut and in stopping the downhill control. The deceleration in restricting the fuel cut and in executing the downhill control may be appropriately set, in consideration of the load durability of the first MG 14 and the second MG 15, the charge capacity of the battery 18, and the like.

The above embodiment has been describing, as an example of restriction of the fuel cut, a case where the fuel cut is restricted for all cylinders 30 of the engine 10, that is, a case where fuel injection is continued in all cylinders 30. However, this configuration is not limited. For example, the fuel cut may be limited to only one of the cylinders 30. In this case, the fuel injection is continued in one of the cylinders 30, and the fuel cut is executed in the other cylinders 30. This is because, also in this case, the deceleration is suppressed as compared to the case where the fuel cut is executed for all the cylinders 30, which suppresses the amount of oxygen supplied to the GPF 44, whereby the excessive temperature rise of the GPF 44 is suppressed.

In the above embodiment, the hybrid vehicle 1 including the engine 10, the first MG 14, and the second MG 15 as traveling power sources, is described as an example, but the hybrid vehicle is not limited thereto. For example, it may be a hybrid vehicle including an engine as a traveling power source and a motor arranged on a power transmission path from the engine to the wheels.

Although some embodiments of the present disclosure have been described in detail, the present disclosure is not limited to the specific embodiments but may be varied or changed within the scope of the present disclosure as claimed.

What is claimed is:

1. A control device for a hybrid vehicle, the control device comprising:
   a deceleration control unit configured to control an engine and a motor as traveling power sources to control deceleration of the hybrid vehicle;
   a fuel cut control unit configured to restrict or permit fuel cut in the engine based on establishment or non-establishment of a predetermined condition;
   a downhill control unit configured to execute downhill control for increasing deceleration during downhill traveling higher than deceleration during flat traveling;
   a deceleration limit unit configured to limit deceleration in restricting the fuel cut and in executing the downhill control lower than deceleration in permitting the fuel cut and in executing the downhill control, and
   an excessive temperature rise estimation unit configured to estimate whether or not a temperature of a filter collecting particulate matters in exhaust gas of the engine excessively rises due to execution of the fuel cut,
   wherein the fuel cut control unit is configured to restrict the fuel cut when the predetermined condition is established on condition that the temperature of the filter is estimated to excessively rise, and is configured to permit the fuel cut when the predetermined condition is not established on condition that the temperature of the filter is estimated not to excessively rise,
   the excessive temperature rise estimation unit is configured to calculate a fuel cut continuable time during which the filter endures the fuel cut, to estimate that the temperature of the filter will not rise excessively, when the fuel cut continuable time is equal to or longer than a threshold, and to estimate that the temperature of the filter will rise excessively, when the fuel cut continuable time is smaller than the threshold,
   when a particulate matter deposition amount in the filter is large, the fuel cut continuable time is calculated to be a small value, as compared to when the particulate matter deposition amount is small, and
   when the temperature of the filter is high, the fuel cut continuable time is calculated to be short, as compared to when the temperature of the filter is low.

2. The control device for the hybrid vehicle according to claim 1, wherein the deceleration limit unit is configured to limit deceleration in restricting the fuel cut and in executing the downhill control higher than deceleration in restricting the fuel cut and in stopping the downhill control.

3. The control device for the hybrid vehicle according to claim 2, wherein the deceleration limit unit is configured to limit deceleration in restricting the fuel cut and in executing the downhill control lower than deceleration in permitting the fuel cut and in stopping the downhill control.

4. The control device for the hybrid vehicle according to claim 1, further comprising a notification control unit configured to notify that deceleration is limited when the fuel cut is restricted.

* * * * *